US012669791B2

(12) United States Patent
Yoon et al.

(10) Patent No.: US 12,669,791 B2
(45) Date of Patent: Jun. 30, 2026

(54) EFFECTIVE SLAVE PARAMETER MANAGEMENT METHOD AND DEVICE OF COMMUNICATION-BASED CONTROL SYSTEM

(71) Applicant: LS ELECTRIC CO., LTD., Anyang-si (KR)

(72) Inventors: Geon Yoon, Anyang-si (KR); Jung Girl Lee, Anyang-si (KR)

(73) Assignee: LS ELECTRIC CO., LTD., Anyang-si (KR)

( * ) Notice: Subject to any disclaimer, the term of this patent is extended or adjusted under 35 U.S.C. 154(b) by 357 days.

(21) Appl. No.: 18/284,984

(22) PCT Filed: Mar. 16, 2022

(86) PCT No.: PCT/KR2022/003666
§ 371 (c)(1),
(2) Date: Sep. 29, 2023

(87) PCT Pub. No.: WO2022/215888
PCT Pub. Date: Oct. 13, 2022

(65) Prior Publication Data
US 2024/0184263 A1 Jun. 6, 2024

(30) Foreign Application Priority Data
Apr. 6, 2021 (KR) ........................ 10-2021-0044557

(51) Int. Cl.
*G05B 19/05* (2006.01)
(52) U.S. Cl.
CPC ......... *G05B 19/052* (2013.01); *G05B 19/056* (2013.01); *G05B 2219/1215* (2013.01)

(58) Field of Classification Search
CPC .............................................. G05B 2219/1215
See application file for complete search history.

(56) References Cited

U.S. PATENT DOCUMENTS

2011/0289176 A1* 11/2011 Toyama .............. H04L 41/0843
709/211
2012/0221755 A1 8/2012 Schultz
(Continued)

FOREIGN PATENT DOCUMENTS

EP 0444535 A2 9/1991
JP 03201054 A 9/1991
(Continued)

OTHER PUBLICATIONS

Extended European Search Report for related European Application No. 22784798.5; action dated Mar. 3, 2025; (9 pages).
(Continued)

*Primary Examiner* — Suresh Suryawanshi
(74) *Attorney, Agent, or Firm* — K&L Gates LLP

(57) ABSTRACT

The present disclosure relates to a method for managing a parameter of a communication-based master-slave control system, and has an effect of storing and applying parameters of all slave devices in a non-volatile memory in a master device, thereby enabling the slave devices to be set-up in a position where an operator is difficult to access or dangerous by a parameter stored in the master device, thereby simplifying maintenance of the slave devices and ensuring safety of a user.

4 Claims, 3 Drawing Sheets

(56)     References Cited

U.S. PATENT DOCUMENTS

| | | | |
|---|---|---|---|
| 2015/0234759 A1* | 8/2015 | Tian | G06F 13/1652 |
| | | | 710/110 |
| 2016/0292110 A1* | 10/2016 | Niwa | G05B 19/054 |
| 2019/0296986 A1* | 9/2019 | Ikeo | H04L 41/22 |
| 2022/0166697 A1* | 5/2022 | Ikeo | H04L 41/147 |

FOREIGN PATENT DOCUMENTS

| | | | | |
|---|---|---|---|---|
| JP | 06161521 | A | | 6/1994 |
| JP | 2003067014 | A | | 3/2003 |
| JP | 2007020150 | A | | 1/2007 |
| JP | 2010097477 | A | * | 4/2010 |
| JP | 2014199006 | A | | 10/2014 |
| JP | 2015211277 | A | * | 11/2015 |
| JP | 2016076183 | A | | 5/2016 |
| JP | 2020027460 | A | | 2/2020 |
| KR | 20090071918 | A | | 7/2009 |
| KR | 20150047396 | A | | 5/2015 |

OTHER PUBLICATIONS

International Search Report for related International Application No. PCT/KR2022/003666; action dated Oct. 13, 2022; (2 pages).
Written Opinion for related International Application No. PCT/KR2022/003666; action dated Oct. 13, 2022; (4 pages).
Notice of Allowance for related Japanese Application No. 2023-544486; action dated Oct. 22, 2024; 3 pages).

* cited by examiner

EFFECTIVE SLAVE PARAMETER MANAGEMENT METHOD AND DEVICE OF COMMUNICATION-BASED CONTROL SYSTEM

CROSS-REFERENCE TO RELATED APPLICATION

This application is a National Stage of International Application No. PCT/KR2022/003666, filed on Mar. 16, 2022, which claims priority to and the benefit of Korean Patent Application No. 10-2021-0044557, filed on Apr. 6, 2021, the disclosure of which is incorporated herein by reference in its entirety.

FIELD

The present disclosure relates to a control system, and more particularly, to a method for managing a control system having a master-slave structure.

BACKGROUND

Control systems such as a programmable logic controller (PLC) are developing into a modular form based on communication. Such control systems increase in size and complexity, and the master device controls the slave devices. At this time, information defining various operations of the slave device is a parameter, and this parameter must be stored in the slave device in advance so that the slave device can operate normally.

Since the slave devices are mainly located at the end of the control system, the number of slave devices increases exponentially as the size of the system increases. Therefore, if the maintenance method of the slave devices is inconvenient or dangerous, the maintenance cost also increases.

FIG. 1 is an example of a conventional PLC system.

The master controller 1 is connected to the slave devices 2 and 3 through communication to control the slave devices 2 and 3. The master controller may be two or more.

In the conventional control system setting-up method, since the shape or size of parameters to be set up for each slave device is different, it is necessary to individually connect PCs 5, 6, and 7 to perform programs or settings.

If it is necessary to download parameters individually to each slave device in this way, there is a problem in that it may take too long to set up or an accident may occur when the distance between each slave device is far or the slave devices are located in a dangerous place.

The inventors of the present disclosure have been researched to solve the problem of such a conventional slave device setting-up. To complete a method and device for managing a communication-based control system that may reduce the set-up time of several complex slave devices and reduce the difficulty of maintenance, many efforts have been made to complete the present disclosure.

SUMMARY

It is an object of the present disclosure to provide a method for reducing an operator's travel time and managing the slave devices more safely by managing and setting-up parameters of several slave devices that are far away from each other in one place.

Meanwhile, still other objects of the present disclosure will be further considered within the scope of easily inferred from the following detailed description and its effects.

The device for managing a slave parameter according to the present disclosure may include:

a controller including one or more processors and memories; and a storage consisting of a non-volatile memory for storing a parameter, wherein the controller receives parameters for all connected slave devices from a setting-up device and stores the parameters in the storage.

The controller may generate parameter IDs for each of the received parameters and stores the parameters and the parameter IDs together in the storage.

The controller may request state information of the slave devices and transfers the parameters stored in the storage to the slave devices when the connected slave devices require parameter reset, and are not occupied by another master device.

The controller may periodically reiterate the request for the state information when the slave device is occupied by another master device.

According to another embodiment of the present disclosure, a method for managing a parameter of a master-slave system may include:

receiving, by the master device, parameters for all slave devices connected to the master device from a parameter setting-up device: requesting, by the master device, slave device information to the connected slave devices; transferring, by the slave devices, the slave device information to the master device in response to the request; transferring, by the master device, a lock request to the slave device when the parameters for the received slave device are applicable according to the slave device information and the slave devices are not occupied by another master device; transferring by the slave devices, a response to the lock request to the master device; transferring, by the master device, the parameters received from the parameter setting-up device to the slave devices when the received response to the lock request is acknowledge (ACK); and transferring, by the slave devices, a parameter reception completion response to the master device when the slave devices receive the parameters.

According to another embodiment of the present disclosure, a method for managing a slave parameter includes:

receiving parameters for all connected slave devices from a parameter setting-up device; storing the received parameters in a storage consisting of a non-volatile memory; requesting state information to the connected slave devices; and transferring the parameters stored in the storage to the connected slave devices when the connected slave devices require parameter reset, and are not occupied by another master device.

The storing the parameters may include generating parameter IDs for each of the parameters and storing the parameters and parameter IDs together.

After requesting the status information, when the slave devices are occupied by another master device, the status information request may be reiterated periodically.

According to the present disclosure, it is possible to reduce the set-up time of the slave device by managing complex and difficult set-up of various types of slave devices having different types in one place.

In addition, since it is not necessary to directly set-up the slave devices far from each other, it is possible to reduce an operator's travel time, thereby saving the operating time, and preventing a dangerous situation.

Meanwhile, even if the effects not explicitly mentioned herein, the effects and its temporary effects described in the following specifications expected by the technical features of the present disclosure are treated as described in the specifications of the present disclosure.

The accompanying drawings are illustrated by reference for understanding the technical idea of the present disclosure, and the scope of the present disclosure is not limited thereto.

DETAILED DESCRIPTION

Hereinafter, the configuration of the present disclosure and the effects resulting from the configuration of the present disclosure guided by various embodiments of the present disclosure will be described with reference to the drawings. In describing the present disclosure, a detailed description thereof will be omitted when it is judged that the known functions related to the present disclosure are obvious to those skilled in the art and may unnecessarily obscure the gist of the present disclosure.

Terms such as 'first' and 'second' may be used to describe various elements, but the elements should not be limited by the above terms. The above terms may be used only for the purpose of distinguishing one element from another. For example, the first component may be termed the second component without departing from the scope of the present disclosure, and similarly, the second component may be termed the first component. Further, the expressions of the singular include the expressions of the plural unless the context clearly dictates otherwise. The terms used in the embodiments of the present disclosure may be interpreted as having a meaning commonly known to those skilled in the art, unless otherwise defined.

Hereinafter, the configuration of the present disclosure and the effects resulting from the configuration of the present disclosure guided by various embodiments of the present disclosure will be described with reference to the drawings.

Figure 1:
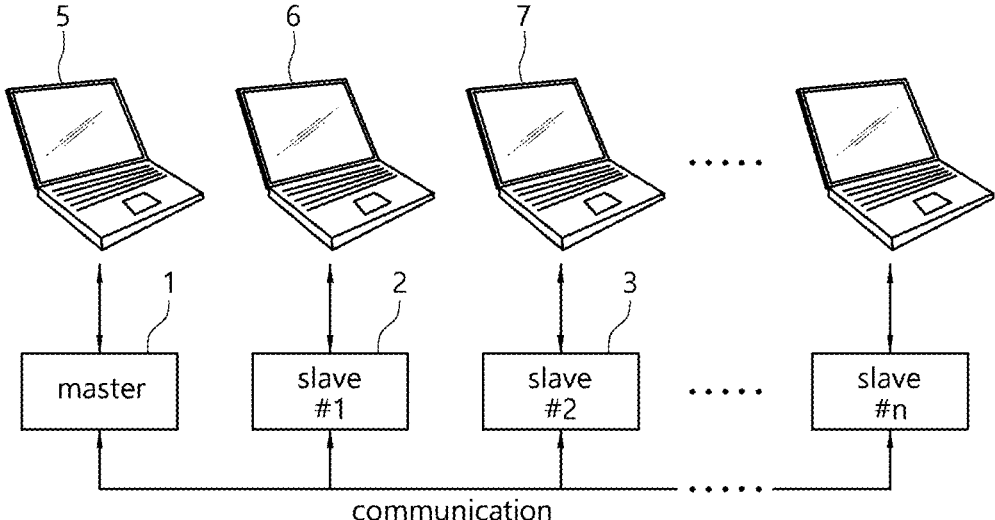
FIG. 1 illustrates a connection structure of a control system according to the prior art.
Figure 2:
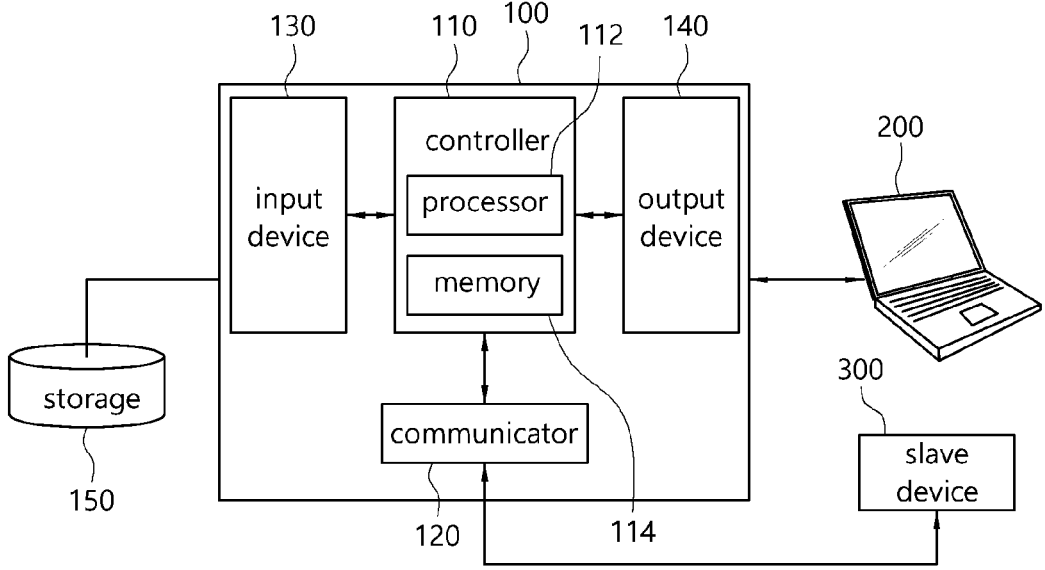
FIG. 2 is a schematic structural diagram of a slave parameter management device according to a preferred embodiment of the present disclosure.

FIG. 2 is a schematic structural diagram of a slave parameter management device according to any preferred embodiment of the present disclosure.

The slave parameter management apparatus 100 according to the present disclosure may include a controller 110, a communicator 120, an input device 130, an output device 140, and a storage 150.

A PLC device or the like may be used as the slave parameter management device 100 that may be used as a master device in a communication-based control system.

The controller 110 includes one or more processors 112 and memories 114, wherein the processor 112 executes instructions for managing slave parameters and the memory 114 stores program codes for driving the processor 112 or necessary data.

The input device 130 is used to receive input data from devices corresponding to an input module among connected slave devices. The controller 110 performs programs set-up by the user using the input data.

The output device 140 is used to transfer program execution result values to devices corresponding to an output module among connected slave devices. The output data is transferred to each slave output module through the output device 140.

The communicator 120 is used to exchange data with the slave device 300 or a setting-up device 200 such as a PC or to control a state thereof.

The storage 150 is used to receive and store parameters of all connected slave devices from the setting-up device 200, and if necessary, transfer the stored parameters to the slave devices. To this end, the storage 150 is formed of a non-volatile memory.

The controller 110 receives parameters of all connected slave devices from the setting-up device 200 and stores the parameters in the storage 150. At this time, an identification (ID) for identifying each parameter to which the slave devices is applied may be stored together. The controller 110 may determine which parameters are applied to each slave device using this parameter ID and transmit appropriate parameters to each slave device if necessary.

The controller 110 may request state information of the connected slave device 300 to determine the state of the slave device 300, and when the parameter needs to be reset such as failure or error occurrence, may identify an ID of a parameter stored in the storage 150 and transfer a corresponding parameter to the slave device 300.

If the slave device 300 is in a state occupied by another master device, it may be possible to identify whether the occupied state is released by periodically sending a request.

According to the slave parameter management device 100 according to the present disclosure, by managing parameters of the slave devices in one place, thereby solving inconvenience and dangerous of setting-up parameters by directly connecting a setting-up device such as a PC or a notebook to each conventional slave device.

Figure 3:
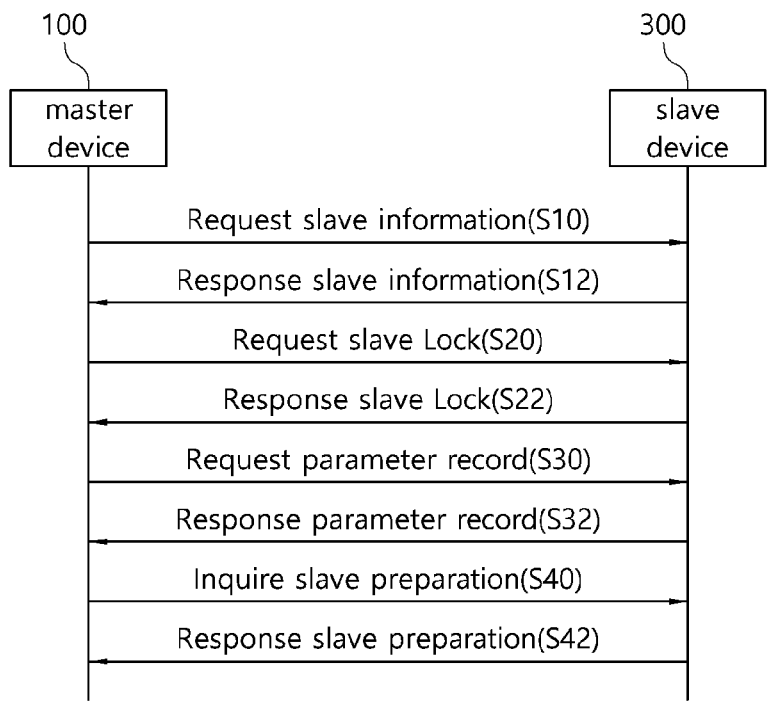
FIG. 3 is a schematic flowchart of a method for managing a slave parameter according to another preferred embodiment of the present disclosure.

FIG. 3 is a schematic flowchart of a method for managing a slave parameter according to another preferred embodiment of the present disclosure.

A specific example of a slave parameter management method performed between the master device 100, which is a slave parameter managing device according to the present disclosure, and the slave device 300 is shown.

The controller of the master device 100 first receives all parameters of the master device 100 and each slave device from a setting-up device such as a PC. It is stored in a storage consisting of a non-volatile memory. At this time, the controller generates parameter IDs for identifying the parameters and stores them together.

The master device 100 transfers a request for reading information of the slave device 300 to the slave device (Step 10).

The slave device 300 transfers information of the slave device 300 in response to the request, and the master device 100 receives the information (Step 12).

The information of the slave device 300 includes state information indicating error or failure information of the slave device 300, information necessary for parameter setting-up, master information, various parameter setting-up states, and the like.

The state information includes whether the slave device 300 is normal or in an error state. Errors include both hardware errors and software errors.

The information needed to set-up the parameters includes an I/O (Input/Output) type or an I/O size of the slave device 300.

An example of the slave device 300 may include an extension driver device such as XGL-DBDT. The extended driver device may mount a plurality of I/O modules, each of which has an individual parameter. Therefore, the master device 100 must select a suitable parameter according to the type of the slave device 300 or the type of the module mounted on the slave device 300 and transfer the selected parameter to the slave device 300 so that it can be applied. Examples of parameters applied to the I/O modules may include a driving channel, a range of input/output voltage (current), an input/output data type, an average processing method, a channel output state, an average value, and the like.

The master information may include information such as whether the slave device 300 is in a state occupied by the master device, or to which master device it is connected.

The parameter IDs generated by the master device 100 may also be included in various parameter setting-up states.

The master device 100 determines whether the slave device may be occupied by the received slave information and then requests a slave lock (Step 20).

Requirements for determining whether the slave device can be occupied include checking master information whether the slave status is normal in the slave device information, whether the parameter received from the setting-up device is applicable by comparing it with the received parameter setting-up information, and whether the slave is occupied by another master.

If these requirements are met, a lock request for occupying the slave device 300 is sent.

If other requirements are met but already occupied by another master, it is possible to periodically transfer a request for slave information to determine whether the occupied state of the slave device 300 has been terminated.

Upon receiving the lock request, the slave device 300 transfers an acknowledge (ACK) response to the master device 100 when it is not occupied by another master device, and transfers a negative acknowledge (NACK) response to the master device 100 when it is already occupied by another master device (Step 22).

That the master device 100 basically sends a lock request only when the slave device 300 is not in an occupied state. That is, the lock request is not sent to the slave device 300 occupied by another master device. However, each developer may have different ways of implementing the software of the master device 100 and the slave device 300, or occupancy may occur by another master device between the occupancy confirmation and the lock request, so that a NACK response to the lock request may occur. Accordingly, the master device 100 identifies the response to the lock request again even after checking the occupied state of the slave device 300, and then proceeds to the next step.

When the master device 100 receives a normal ACK response from the slave device 300, the master device 100 transfers the parameter together with the parameter ID to the slave device 300 (Step 30).

At this time, when the parameter ID is identified in the slave information received from the slave device 300 and is identical to the parameter ID received from the setting-up device, the parameter may not be transferred. Since the parameter ID is a unique value, the identity of the entire parameter may be confirmed by the parameter ID even if the entire parameter is not compared.

Since the parameter ID is a unique value that the master device 100 calculates and generates again whenever the parameter is changed, the slave device 300 should not change the parameter ID. In addition, the parameter and the parameter ID may be stored in the non-volatile memory of the slave device 300 together in consideration of the power on/off situation.

When the slave device 300 receives the parameter, the slave device 300 transfers a reception completion response to the master device (Step 32).

When the parameter transmission and setting-up are completed, the master device 100 transfers a message inquiring whether operation preparation of the slave device 300 is complete (Step 40).

The slave device 300 may receive the parameter and then apply the parameters required for operation to the internal system, and backup the received parameter and then transfer a preparation completion response (Step 42).

When the parameter application and the backup take a long time, the NAK response may be first transferred and then, when the preparation is completed, the ACK response may be transferred again.

When the master device 100 receives the ACK response for the preparation completion from all the slave devices, the master device 100 starts controlling the entire system.

According to the above-described slave parameter management device and method of the present disclosure, since a master device intensively stores and manages parameters for the slave device, it is possible to set a setting-up for the slave device in a position difficult or dangerous for an operator to access by a parameter stored in the master device, thereby simplifying maintenance of the slave device and ensuring safety of a user.

The scope of the present disclosure is not limited to the description and expression of the exemplary embodiments explicitly described above. In addition, it is again suggested that the scope of the present disclosure may not be limited because the modification or substitution is obvious in the art to which the present disclosure pertains.

What is claimed is:

1. A method for managing a slave parameter, wherein the method is performed by a controller comprising one or more processors and memories, the method comprising:
   receiving parameters for all slave devices from a parameter setting device, wherein all of the slave devices are connected to a master device;
   storing the received parameters together with parameter identifiers (IDs) in a storage consisting of a non-volatile memory, wherein each of the parameter IDs corresponds to a parameter configuration to be applied to a corresponding slave device from among the received parameters;
   requesting state information to the connected slave devices;
   determining a requirement for resetting parameters for a slave device from among the slave devices;
   determining that the slave device is not occupied by another master device; and
   transferring the parameters stored in the storage to the slave device,
   wherein the requirement for resetting the parameters for the slave device is determined based on the state information and a comparison of a parameter ID for the parameters to be transmitted to the slave device with a parameter ID stored in the slave device.

2. The method of claim 1, wherein after requesting the state information, when the slave devices are occupied by another master device, periodically re-requesting the state information.

3. A method for managing a parameter of a master-slave system including a master device and one or more slave devices, the method comprising:

receiving, by the master device, parameters for all slave devices connected to the master device from a parameter setting-up device;

storing, by the master device, the received parameters together with parameter identifiers (IDs) in a storage, wherein each of the parameter IDs corresponds to a parameter configuration to be applied to a corresponding slave device from among the received parameters;

requesting, by the master device, state information to the connected slave devices;

transferring, by the slave devices, the state information to the master device in response to the request;

determining, by the master device, a requirement for resetting parameters for a slave device from among the slave devices;

determining, by the master device, that the slave device is not occupied by another master device; and transferring, by the master device, the parameters stored in the storage to the slave device, wherein the requirement for resetting the parameters for the slave device is determined based on the state information and a comparison of a parameter ID for the parameters to be transmitted to the slave device with a parameter ID stored in the slave device.

4. A device for managing a slave parameter, the device comprising:

a controller including one or more processors and memories; and a storage consisting of a non-volatile memory, wherein the controller is configured to:

receive parameters for all slave devices from a parameter setting device, wherein all of the slave devices are connected to the device, store the received parameters together with parameter identifiers (IDs) in the storage, wherein each of the parameter IDs corresponds to a parameter configuration to be applied to a corresponding slave device from among the received parameters, request state information to the slave devices connected to the device;

determine a requirement for resetting parameters for a slave device from among the slave devices;

determine that the slave device is not occupied by another master device; and transfer the parameters stored in the storage to the slave device, wherein the requirement for resetting the parameters for the slave device is determined based on the state information and a comparison of a parameter ID for the parameters to be transmitted to the slave device with a parameter ID stored in the slave device.

\* \* \* \* \*